United States Patent
Kozono et al.

(10) Patent No.: US 8,163,423 B2
(45) Date of Patent: *Apr. 24, 2012

(54) NON-AQUEOUS ELECTROLYTE BATTERY AND METHOD OF MANUFACTURING THE SAME

(75) Inventors: Suguru Kozono, Kyoto (JP); Ichiro Tanaka, Kyoto (JP); Shigeki Yamate, Kyoto (JP); Naohiro Tsumura, Kyoto (JP); Yoshihiro Katayama, Kyoto (JP); Toshiyuki Nukuda, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 380 days.

This patent is subject to a terminal disclaimer.

(21) Appl. No.: 12/085,934

(22) PCT Filed: Dec. 1, 2006

(86) PCT No.: PCT/JP2006/324496
§ 371 (c)(1),
(2), (4) Date: Jun. 2, 2008

(87) PCT Pub. No.: WO2007/064043
PCT Pub. Date: Jun. 7, 2007

(65) Prior Publication Data
US 2009/0286160 A1   Nov. 19, 2009

(30) Foreign Application Priority Data
Dec. 2, 2005   (JP) .................. 2005-349067

(51) Int. Cl.
*H01M 4/58*   (2010.01)
*H01M 6/18*   (2006.01)

(52) U.S. Cl. ............... 429/231.8; 429/231.1; 429/231.5; 429/329; 429/340; 429/341

(58) Field of Classification Search .................. 429/50, 429/163, 231.95, 231.1, 231.5, 231.8, 329, 429/340, 341; *H01M 10/40*
See application file for complete search history.

(56) References Cited

U.S. PATENT DOCUMENTS 6,482,550 B1 * 11/2002 Imachi et al. ............... 429/338
2005/0221187 A1 * 10/2005 Inagaki et al. ........... 429/231.95

FOREIGN PATENT DOCUMENTS

| JP | S62-090863 | 4/1987 |
| JP | S63-121259 | 5/1988 |
| JP | 2000-348725 | 12/2000 |
| JP | 2001-216962 | 8/2001 |

OTHER PUBLICATIONS

English translation of Kawamoto (JP2000348725).*

* cited by examiner

*Primary Examiner* — Melvin Mayes
*Assistant Examiner* — Jun Li
(74) *Attorney, Agent, or Firm* — Manabu Kanesaka

(57) ABSTRACT

Gas generation of a non-aqueous electrolyte battery having a negative active material that intercalates/deintercalates lithium ions at a potential not lower than 1.2 V relative to the potential of lithium as negative electrode is suppressed.

A non-aqueous electrolyte battery comprising a non-aqueous electrolyte containing an electrolyte salt and a non-aqueous solvent, a positive electrode and a negative electrode is characterized in that the main active material of said negative electrode is an active material that intercalates/deintercalates lithium ions at a potential not lower than 1.2 V relative to the potential of lithium and the auxiliary active material of said negative electrode is an active material that at least intercalates lithium ions at a potential lower than 1.2 V relative to the potential of lithium and that there exists lithium showing a spin-lattice relaxation time ($T_1$) of not less than 1 second as determined by a solid-state Li—NMR measurement in the main active material of said negative electrode. A method of manufacturing a non-aqueous electrolyte battery containing a non-aqueous electrolyte, a positive electrode and a negative electrode (a main active material and an auxiliary active material of the negative electrode) is characterized in that the negative electrode potential is lowered to not higher than 0.8 V relative to the potential of lithium at least once in the initial cycle.

11 Claims, 2 Drawing Sheets

F I G. 1
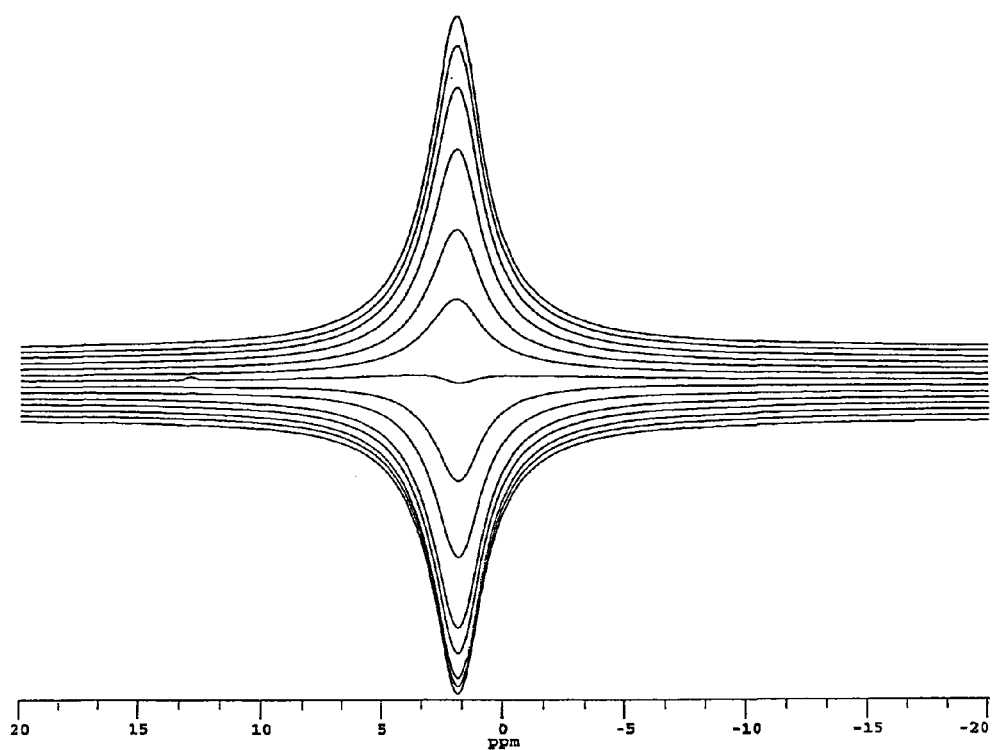

NON-AQUEOUS ELECTROLYTE BATTERY AND METHOD OF MANUFACTURING THE SAME

TECHNICAL FIELD

The present invention relates to a non-aqueous electrolyte battery that suppresses gas generation and shows little volume changes.

BACKGROUND ART

Non-aqueous electrolyte batteries, which typically include lithium ion secondary batteries, have recently been and currently are finding practical applications as electrochemical devices showing a high energy density. Ordinary lithium ion secondary batteries have a positive electrode formed by using transition metal oxide as positive active material and a negative electrode formed by using carbon as negative active material and contains an electrolyte salt which is a lithium salt such as $LiPF_6$ and a non-aqueous electrolyte which is a carbonate type organic solvent. However, intercalation/deintercalation of most lithium ions takes place at a potential level lower than the reduction decomposition potential of the non-aqueous solvent to the carbon material. Therefore, while lithium ion secondary batteries show a high energy density, they are accompanied by a problem of a short service life and poor operation characteristics at high temperature.

Proposals have been made to use a negative active material with which intercalation/deintercalation of lithium ions takes place at a potential level higher than the reduction decomposition potential of the non-aqueous solvent. According to these proposals, lithium titanate with which intercalation/deintercalation of lithium ions takes place at about 1.5 V is employed as the negative active material (refer to, e.g., Patent Document 1). Lithium ion batteries having a negative electrode of such a negative active material show an excellent service life and good operation characteristics at high temperature. Many papers have been published and many reports have been made at scientific conferences on non-aqueous electrolyte batteries using lithium titanate as negative active material and such non-aqueous electrolyte batteries have been commercialized (refer to, e.g., Non-Patent Document 1, coin-type lithium ion secondary battery (SONY) etc.). Additionally, the use of lithium titanate as negative active material in highly reliable capacitors has been discussed in recent years for the purpose of improving the energy density thereof.
Patent Document 1: JP-B-3502118
Non-Patent Document 1: Journal of Power Sources 146 (2005) 636-639

However, Non-aqueous electrolyte batteries employing lithium titanate as negative active material are accompanied by a problem of gas generation. This problem hardly occurs in coil batteries and cylindrical batteries having a very strong battery jar but can arise as swollen batteries in the case of flat type batteries and batteries using metal resin laminate film as sheath. A proposal has been made to suppress gas generation by optimizing the carbonic substance that is a conducting agent in order to dissolve this problem (refer to, e.g., Patent Document 2).
Patent Document 2: JP-A-2005-100770

Besides, proposals of admixing an active material that occludes lithium ions at a potential lower than that of lithium titanate as auxiliary negative active material have been made as anti-overdischarge/anti-overcharge measures of a lithium ion battery employing lithium titanate as negative active material (refer to, e.g., Patent Document 3).

Patent Document 3: JP-B-3269396

Furthermore, proposals of admixing amorphous carbon as auxiliary negative active material to improve the cycle characteristic of a lithium ion battery employing lithium titanate as negative active material have been made (refer to, e.g., Patent Document 4).
Patent Document 4: JP-A-2001-126727

Additionally, proposal of admixing lithium titanate as auxiliary negative active material as anti-overdischarge measures of a lithium ion battery employing a carbon material as negative active material have been made (refer to, e.g., Patent Document 5).
Patent Document 5: JP-A-2004-63394

Still additionally, the invention of "a non-aqueous electrolyte secondary battery characterized by comprising a housing member, a non-aqueous electrolyte contained in the housing member and containing chain sulfite, a positive electrode contained in the housing member and capable of occluding/releasing Li and a negative electrode contained in the housing member and containing a conducting agent containing a carbonic substance and lithium titanate" is known (refer to, e.g., Patent Document 6).

The Patent Document 6 describes that "this additive forms a fine and stable coat film on the surface of the negative electrode at a negative electrode potential of about 1.3 V, which stably exists within the normal voltage range of the non-aqueous electrolyte secondary battery thereafter." and that "as a result of checking it by means of a surface analysis, the film coat was constituted by an inorganic film coat where $Li_2SO_3$ exists as principal ingredient and mixed with LiF and other ingredients and an organic film coat formed by $ROsO_2Li$, $ROCO_2Li$, $R=CH_3(CH)CH_2$ or $R=CH_2-CH_2$ and other ingredients." (paragraphs 0031, 0033, 0114, 0123) and also describes that "a carbonic substance is employed as conducting agent for increasing conductivity and reducing the contact resistance with the collector. The additive to be employed for the purpose of the present invention can form a fine and stable film coat on the surface of the carbonic substance. The film coat has a strong effect of obstructing the reaction of the carbonic substance and the non-aqueous electrolyte and suppressing gas generation and shows an excellent hot cycle characteristic". However, since the "carbonic substance" is a conducting agent and not an active material and hence its effect of suppressing gas generation is not satisfactory as evidenced by examples (Comparative Examples 2, 3) hereinafter and a non-aqueous electrolyte containing a specific additive of "chain sulfite" has to be used in order to form a film coat containing lithium ions of "$Li_2SO_3$", "LiF" or the like.
Patent Document 6: JP-A-2005-317508

Patent Document 7 describes that "while no particular problem arises when a non-aqueous electrolyte secondary battery employing lithium titanate as negative active material is used as main power source of a portable appliance, there arises a problem of degraded battery characteristics when the non-aqueous electrolyte secondary battery is used as memory backup power source showing an operating voltage of about 3.0 V. The reason for this is that, when a non-aqueous electrolyte secondary battery as described above is used as main power source of a portable appliance, a film coat showing an excellent ion conductivity is formed on the surface of the negative electrode because the negative electrode is charged to about 0.1 V in reference to lithium metal and the film coat suppresses the reaction of the negative electrode, and prevents the decomposition of the non-aqueous electrolyte, or prevents to destroy and the negative electrode structurally. To the contrary, when a non-aqueous electrolyte secondary battery as described above is used as memory backup power source showing an operating voltage of about 3.0 V, the charging step is conducted with a minute electric current of about 1 to 5 μA, while maintaining a constant voltage condition of about 3.0 V for long period, and the negative electrode is charged only to about 0.8 V in reference to lithium metal so that no such a film coat is formed on the surface of the negative electrode and hence the negative electrode and the non-aqueous liquid electrolyte react with each other to decompose the non-aqueous liquid electrolyte and structurally destroy the negative electrode" (see paragraphs 0006 and 0007). However, the invention described in the Patent Document 7 is "a non-aqueous electrolyte secondary battery comprising a positive electrode and a negative electrode containing a negative active material of lithium titanate and a conducting agent and a non-aqueous electrolyte, characterized in that the conducting agent used in the negative electrode is vapor grown carbon fiber that is graphitized and showing a lattice constant $C_0$ of not less than 6.7 Å and not more than 6.8 Å in the laminating direction as determined by X-ray diffraction." (Claim 1) and "the conducting agent" of the negative electrode adapted to use lithium titanate as active material is modified on condition that "the secondary battery is charged with a minute electric current of about 1 to 5 μA, while maintaining a constant voltage condition of about 3.0 V for long period" (paragraph 0008) so that the Patent Document 7 does not suggest charging a non-aqueous electrolyte secondary battery comprising a negative electrode containing lithium titanate and some other auxiliary active material to about 0.1 V in reference to lithium metal.

Patent Document 7: JP-A-2005-317509

DISCLOSURE OF THE INVENTION

Problem to be Solved by the Invention

However, as evidenced by examples hereinafter, the effect of suppressing gas generation is not satisfactory if the conducting agent is optimized and this problem becomes remarkable in a high temperature region. Gas generation of a lithium ion secondary battery that arises when lithium titanate is employed as negative active material is presumably related to lithium titanate and hence cannot be suppressed sufficiently unless the lithium titanate negative electrode is improved.

Additionally, while many proposals of admixing a carbon material as auxiliary active material to lithium titanate have been made, gas swelling is accelerated in many cases by admixing such a material.

Therefore, the problem to be solved by the present invention is to suppress gas generation of a non-aqueous electrolyte battery having a negative active material that intercalates/deintercalates lithium ions at a potential not lower than 1.2 V relative to the potential of lithium as negative electrode by simple means.

Means for Solving the Problem

According to the present invention, the above problem is dissolved by providing the followings.

(1) A non-aqueous electrolyte battery comprising a non-aqueous electrolyte containing an electrolyte salt and a non-aqueous solvent, a positive electrode and a negative electrode, characterized in that the main active material of the negative electrode is an active material that intercalates/deintercalates lithium ions at a potential not lower than 1.2 V relative to the potential of lithium and the auxiliary active material of the negative electrode is a low temperature baked carbon material that at least intercalates lithium ions at a potential lower than 1.2 V relative to the potential of lithium and shows an interplanar spacing of the (002) plane of not less than 0.34 nm, a crystallite size Lc of not more than 100 nm as observed by wide-angle X-ray diffractometry, and a BET specific surface area of not more than 30 $m^2/g$ and that there exists lithium showing a spin-lattice relaxation time ($T_1$) of not less than 1 second as determined by a solid-state Li—NMR measurement in the main active material of said negative electrode.

(2) The non-aqueous electrolyte battery as defined in (1) above, characterized in that a film coat having a carbonate structure exists in the surface of the negative electrode.

(3) The non-aqueous electrolyte battery as defined in (1) or (2) above, characterized in that the main active material of the negative electrode is spinel-type lithium titanate.

(4) The non-aqueous electrolyte battery as defined in any one of (1) through (3) above, characterized in that lithium showing a spin-lattice relaxation time ($T_1$) of not less than 1 second as observed by a solid-state Li—NMR measurement is made to exist in the main active material of said negative electrode by lowering the potential of the negative electrode to not higher than 0.8 V relative to the potential of lithium at least once before operating the non-aqueous electrolyte battery.

(5) The non-aqueous electrolyte battery as defined in (4) above, characterized in that the non-aqueous electrolyte battery is designed such that the potential of the positive electrode becomes not higher than 4.5 V relative to the potential of lithium when the potential of the negative electrode becomes not higher than 0.8 V relative to the potential of lithium.

(6) The non-aqueous electrolyte battery as defined in any one of (1) through (5) above, characterized in that the collector of said negative electrode is copper, nickel or an alloy of them.

(7) The non-aqueous electrolyte battery as defined in any one of (1) through (6) above, characterized in that the non-aqueous electrolyte battery is operated in a region of the potential of the negative electrode higher than 0.8 V relative to the potential of lithium.

(8) A method of manufacturing a non-aqueous electrolyte battery containing a non-aqueous electrolyte containing an electrolyte salt and a non-aqueous solvent, a positive electrode and a negative electrode, characterized in that an active material that intercalates/deintercalates lithium ions at a potential not lower than 1.2 V relative to the potential of lithium is used for the main active material of said negative electrode and a low-temperature baked carbon material that at least intercalates lithium ions at a potential lower than 1.2 V relative to the potential of lithium and shows an interplanar spacing of the (002) plane of not less than 0.34 nm, a crystallite size Lc of not more than 100 nm as observed by wide-angle X-ray diffractometry, and a BET specific surface area of not more than 30 $m^2/g$ is used for the auxiliary active material of the negative electrode and that the potential of the negative electrode is lowered to not higher than 0.8 V relative to the potential of lithium at least once in the initial cycle.

(9) The method of manufacturing a non-aqueous electrolyte battery as defined in (8) above, characterized in that lithium showing a spin-lattice relaxation time ($T_1$) of not less than 1 second as determined by a solid-state Li—NMR measurement is made to exist in the main active material of said negative electrode by lowering the potential of the negative electrode to not higher than 0.8 V relative to the potential of lithium at least once in the initial cycle.

(10) The method of manufacturing a non-aqueous electrolyte battery as defined in (8) or (9) above, characterized in that a film coat having a carbonate structure is made to exist in the surface of said negative electrode by lowering the potential of the negative electrode to not higher than 0.8 V relative to the potential of lithium at least once in the initial cycle.

(11) The method of manufacturing a non-aqueous electrolyte battery as defined in any one of (8) through (10) above, characterized in that the main active material of said negative electrode is spinel-type lithium titanate.

(12) The method of manufacturing a non-aqueous electrolyte battery as defined in any one of (8) through (11) above, characterized in that the potential of the negative electrode is lowered to not higher than 0.8 V relative to the potential of lithium by raising the charging voltage above the operating voltage in the initial cycle.

(13) The method of manufacturing a non-aqueous electrolyte battery as defined in (12) above, characterized in that the potential of the positive electrode is made to become not higher than 4.5 V relative to the potential of lithium when the potential of the negative electrode becomes not higher than 0.8 V relative to the potential of lithium.

For the purpose of the present invention, "an active material that intercalates/deintercalates lithium ions at a potential not lower than 1.2 V relative to the potential of lithium" refers to "an active material that scarcely shows reactions of intercalating/deintercalating lithium ions at a potential lower than 1.2 V and exclusively does so at a potential not lower than 1.2 V" and more specifically to "an active material that shows reactions of intercalating/deintercalating lithium ions at a potential of not lower than 1.2 V relative to the potential of lithium, accompanying an electrochemical capacity of not less than 100 mAh/g per unit weight of the active material". For the purpose of the present invention, "an active material that at least intercalates lithium ions at a potential lower than 1.2 V relative to the potential of lithium" refers to "an active material that scarcely shows reactions of intercalating/ deintercalating lithium ions at a potential not lower than 1.2 V and exclusively does so at a potential lower than 1.2 V relative to the potential of lithium" and more specifically to "an active material that shows reactions of intercalating/deintercalating lithium ions at a potential of lower than 1.2 V relative to the potential of lithium, accompanying an electrochemical capacity of not less than 100 mAh/g per unit weight of the active material".

While lithium showing a spin-lattice relaxation time ($T_1$) of not less than 1 second as observed by a solid-state Li—NMR measurement does not exist in the negative active material of conventional non-aqueous electrolyte batteries employing a negative active material that intercalates/deintercalates lithium ions at a potential not lower than 1.2 V as will be described in greater detail hereinafter, a non-aqueous electrolyte battery according to the present invention is characterized in that lithium showing a spin-lattice relaxation time ($T_1$) of not less than 1 second as observed by a solid-state Li—NMR measurement is made to exist in the main active material of said negative electrode by means of an electrochemical, chemical and/or physical treatments. While a main active material and an auxiliary active material exist in the negative electrode, the influence of the electrochemical, chemical and/or physical treatments is inevitably exerted on the auxiliary active material when a negative electrode is prepared to contain both a main active material and an auxiliary active material so that the state of existence of lithium is defined thereby in the main active material of the negative electrode to by turn define the characteristics of the non-aqueous electrolyte battery.

Since the gas absorbing function of low-temperature baked carbon material is expressed when lithium ions are intercalated once, both gas generation and appearance of a swollen non-aqueous electrolyte battery can be suppressed by selecting a low-temperature baked material as auxiliary active material as described in (1) above. Additionally, according to a finding of the inventor of the present invention, an auxiliary active material that empirically shows higher irreversibility relative to intercalation/deintercalation of lithium ions tends to be superior in terms of gas absorbability.

As described in (4), (5), (8), (9), (10), (12) and (13) above, lithium showing a spin-lattice relaxation time ($T_1$) of not less than 1 second as determined by a solid-state Li—NMR measurement can be made to exist electrochemically in the main active material of the negative electrode by lowering the potential of the negative electrode to not higher than 0.8 V. Then, since lithium source is supplied from the positive active material and the influence of the electrochemical treatment is exerted on the auxiliary active material of the negative electrode, it may be safe to assume that lithium clusters and/or lithium ions exist on and are adsorbed to the auxiliary active material or the surface thereof. Then, both the potential of the main active material and that of the auxiliary active material of the negative electrode are lowered to not higher than 0.8 V simultaneously and a film coat having a carbonate structure is formed on the surface of the negative electrode.

For the purpose of the present invention, "the initial cycle" refers to the electric charging/discharging cycle during the process of manufacturing the non-aqueous electrolyte battery which includes the electric charging/discharging cycle after sealing the non-aqueous electrolyte battery.

ADVANTAGES OF THE INVENTION

Since a non-aqueous electrolyte battery according to the present invention is formed by using an active material that intercalates/deintercalates lithium ions at a potential not lower than 1.2 V relative to the potential of lithium as main active material for the negative electrode and an active material that at least intercalates lithium ions at a potential lower than 1.2 V relative to the potential of lithium as auxiliary active material for the negative electrode so that lithium clusters and/or lithium ions exist on and are adsorbed to the auxiliary active material or the surface thereof in advance. Thus, a non-aqueous electrolyte battery according to the present invention has advantages including an excellent service life, excellent high template characteristics and an ability of suppressing swelling by gas.

BRIEF DESCRIPTION OF THE DRAWINGS

FIG. 1 is a graph illustrating the observed spectrum of the spin-lattice relaxation time ($T_1$) of the negative active material used in Example Battery 5.

BEST MODE FOR CARRYING OUT THE INVENTION

Figure 2:
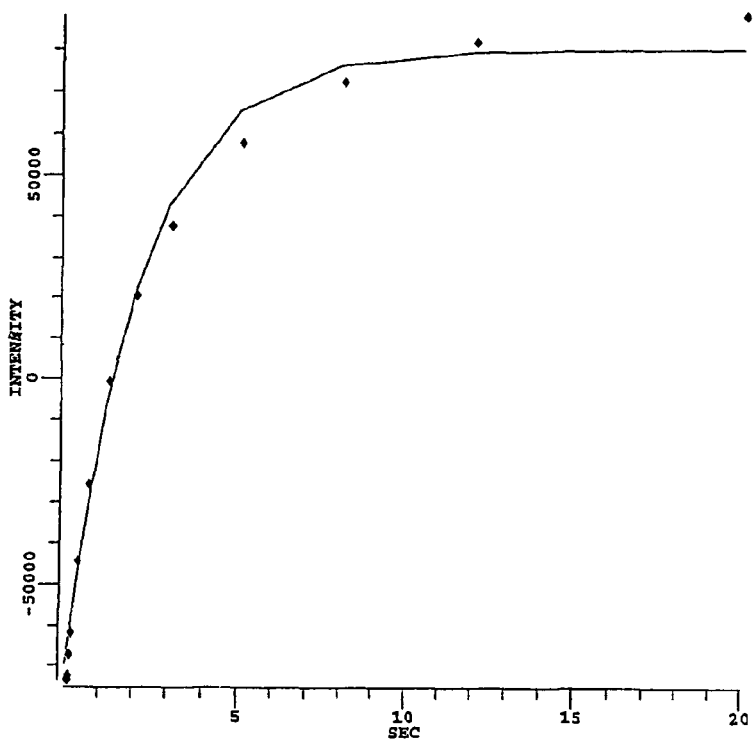
FIG. 2 is a graph illustrating the results of analysis of the spin-lattice relaxation time ($T_1$) of the negative active material used in Example Battery 5 (an instance where Li having one relaxation time is assumed to exist).

Now, the positive electrode, the negative electrode, the separator and the non-aqueous electrolyte of a non-aqueous electrolyte battery according to the present invention will be described below.

Materials that can be used as positive active material non-limitatively include various oxides and sulfides. Examples of material that can be used for the positive electrode include manganese dioxide ($MnO_2$), iron oxide, copper oxide, nickel oxide, lithium-manganese composite oxide (e.g., $Li_xMn_2O_4$ or $Li_xMnO_2$), lithium-nickel composite oxide (e.g., $Li_xNiO_2$), lithium-cobalt composite oxide (e.g., $Li_xCoO_2$), lithium-nickel-cobalt composite oxide (e.g., $LiNi_{1-y}Co_yO_2$), lithium-transition metal composite oxide (e.g., $LiNi_x\text{-}Co_yMn_{1-y-z}O_2$), spinel type lithium-manganese-nickel composite oxide ($Li_xMn_{2-y}Ni_yO_4$), lithium-phosphorous oxide having an olivine structure ($Li_xFePO_4$, $Li_xFe_{1-y}Mn_yPO_4$, $Li_x\text{-}CoPO_4$, etc.), iron sulfate ($Fe_2(SO_4)_3$) and vanadium oxide (e.g., $V_2O_5$). Other materials that can be used for the positive electrode include organic and inorganic materials such as conductive polymers such as polyaniline and polypyrrole, disulfide based polymers, sulfur (S) and carbon fluoride.

Examples of conducting agent that can be used for the positive electrode include acetylene black, carbon black and graphite. Examples of binding agent that can be used for the positive electrode include polytetrafluoroethylene (PTFE), polyvinylidene fluoride (PVdF) and fluorine based rubber.

Examples of collector material that can be used for the positive electrode include aluminum and aluminum alloys.

Materials that can be used as principal ingredient, or main active material, of the negative electrode include those that intercalates/deintercalates lithium ions at a potential not lower than 1.2 V relative to the potential of lithium. Examples of such material include molybdenum oxide, iron sulfide, titanium sulfide and lithium titanate. For the purpose of the present invention, lithium titanate having a spinel type structure expressed by chemical formula of $Li_{4+x}Ti_5O_{12}$ ($0 \leq x \leq 3$) is preferable.

Examples of conducting agent that can be used for the negative electrode include acetylene black, carbon black and graphite. Examples of binding agent that can be used for the negative electrode include polytetrafluoroethylene (PTFE), polyvinylidene fluoride (PVdF) and fluorine based rubber.

Aluminum that is a popular collector material for the negative electrode is alloyed with lithium at a potential not higher than 0.4 V. Therefore, a metal or an alloy of the metal that is not alloyed with lithium is preferably selected for the collector. Examples of such material include copper, nickel and alloys of such metals.

Materials that can be used as auxiliary ingredient, or auxiliary active material, of the negative electrode include those that can intercalate lithium ions at a potential lower than 1.2 V relative to the potential of lithium. Examples of such material include carbon materials, $Fe_2O_3$, $LiFe_5O_8$, $SiO_2$ and SnO. Particularly, the use of a carbon material is preferable because it can also be used as conducting agent. Of carbon materials, low-temperature baked carbon materials showing an interplanar spacing of the (002) plane of not less than 0.34 nm, a crystallite size Lc of not more than 100 nm as observed by wide-angle X-ray diffractometry, and a BET specific surface area of not more than 30 $m^2/g$.

The content ratio of the auxiliary active material is preferably made as low as possible if judged from the viewpoint of energy density. On the other hand, it is preferably made as high as possible if judged from the viewpoint of gas absorbability. Therefore, the mass ratio of lithium titanate to the auxiliary active material is from 95:5 to 60:40, preferably about from 90:10 to 70:30 although it may depend on the type of the auxiliary active material and the circumstances of the use thereof.

For the purpose of the present invention, it is important from the viewpoint of preventing a swollen non-aqueous electrolyte battery from being produced due to gas generation that there exists lithium showing a spin-lattice relaxation time ($T_1$) of not less than 1 second as determined by a solid-state Li—NMR measurement in the main active material of the negative electrode. If so, it may be safe to assume that lithium clusters and/or lithium ions exist on and are adsorbed to the auxiliary active material or the surface thereof.

For the purpose of the present invention, the main active material and the auxiliary active material of the negative electrode can be formed by means of an electrochemical treatment in a manner as evidenced in examples shown below, although they may alternatively be formed by way of a chemical or physical treatment. The process of treatment of the present invention can be applied regardless of the type of the positive active material.

A technique of lowering the potential of the negative electrode to not higher than 0.8 V relative to the potential of lithium at least once before operating the non-aqueous electrolyte battery (in the initial cycle) in order to make lithium showing a spin-lattice relaxation time ($T_1$) of not less than 1 second as determined by a solid-state Li—NMR measurement exist in the main active material of the negative electrode and lithium clusters and/or lithium ions exist on and are adsorbed to the auxiliary active material or the surface thereof may be adopted for the purpose of the present invention.

The potential of the negative electrode is preferably lowered to not higher than 0.3 V in order to make lithium clusters and/or lithium ions exist on and are adsorbed to the auxiliary active material of the negative electrode or the surface thereof.

Lithium showing a spin-lattice relaxation time ($T_1$) of not less than 1 second as determined by a solid-state Li—NMR measurement can be made to exist in the main active material of the negative electrode and lithium clusters and/or lithium ions can be made to exist on and are adsorbed to the auxiliary active material or the surface thereof in a non-aqueous electrolyte battery by charging the battery so as to lower the potential of the negative electrode to not higher than 0.8 V relative to the potential of lithium after forming an electrode group including a positive electrode and a negative electrode so long as the positive electrode contains a positive active material that contains lithium because lithium source is supplied from the positive electrode.

Additionally, the gas absorbing function of a non-aqueous electrolyte battery according to the present invention is expressed by making the main active material and the auxiliary active material of the negative electrode intercalate lithium ions at least once so that initial cycle can be realized after sealing the non-aqueous electrolyte battery.

It is preferable that the non-aqueous electrolyte battery according to the present invention is used in a region of the negative electrode potential higher than 0.8 V relative to the potential of lithium. However, by raising the charging voltage above the operating voltage in the initial cycle, the negative electrode potential is lowered to not higher than 0.8 V relative to the potential of lithium.

At this time, both the main active material and the auxiliary active material of the negative electrode become to show a potential not higher than 0.8 V simultaneously so that a film coat having a carbonate structure is formed on the surface of the negative electrode so long as the solvent of the non-aqueous electrolyte contains a non-aqueous solvent having a carbonate structure.

A process of making lithium showing a spin-lattice relaxation time ($T_1$) of not less than 1 second as determined by a solid-state Li—NMR measurement exist in the main active material of the negative electrode and also making lithium clusters and/or lithium ions exist on and to be adsorbed to the auxiliary active material or the surface thereof by preparing a cell having lithium-containing electrodes as counter electrode separately and making the potential of the negative electrode not higher than 0.8 V relative to the potential of lithium and subsequently taking out the negative electrode to assemble a non-aqueous electrolyte battery may also be adopted for the purpose of the present invention.

Separators that can be used for the purpose of the present invention include porous film containing polyethylene, polypropylene, cellulose or polyvinylidene fluoride (PVdF) and unwoven fabric made of synthetic resin.

Examples of electrolyte salt that can be used for the purpose of the present invention include lithium salts such as lithium perchlorate ($LiClO_4$), lithium hexafluorophosphate ($LiPF_6$), lithium tetrafluoroborate ($LiBF_4$), lithium hexafluoroarsenic ($LiAsF_6$), lithium trifluoromethane sulfonate ($LiCF_3SO_3$) and lithium bis(trifluoromethylsulfonyl)imide [$LiN(CF_3SO_2)_2$].

Examples of non-aqueous solvent (organic solvent) that can be used for the purpose of the present invention include cyclic carbonates such as ethylene carbonate (EC), propylene carbonate (PC) and vinylene carbonate (VC), chain carbonates such as dimethyl carbonate (DMC), methylethyl carbonate (MEC), and diethyl carbonate (DEC), cyclic ethers such as tetrahydrofuran (THF) and 2-methyltetrahydrofuran (2MeTHF), chain ethers such as dimethoxyethane (DME), γ-butylolactone (BL), acetonitrile (AN) and sulforan (SL). A room temperature molten salt containing lithium ions can also be used as non-aqueous electrolyte for the purpose of the present invention.

Now, the present invention will be described in greater detail by way of examples and comparative examples, which, however, does not limit the spirit and scope of the present invention by any means.

EXAMPLE I

Comparative Example Batteries 1 through 4 and Example Batteries 1 through 4 as described below were prepared as non-aqueous electrolyte batteries.

COMPARATIVE EXAMPLE BATTERY 1

<Preparation of Positive Electrode>
Powder of lithium/transition metal composite oxide ($LiNi_{1/3}Co_{1/3}Mn_{1/3}O_2$), which was to operate as positive active material, acetylene black and polyvinylidene fluoride (PVdF) were mixed by 90 mass %, 5 mass % and 5 mass % respectively and added to N-methylpyrrolidone (NMP) to form slurry, which was then applied to the both surfaces of a collector, which was a piece of aluminum foil of 20 μm, to make it show an electrode density of 26 mg/cm² (excluding the collector), dried and pressed to form a positive electrode.
<Preparation of Negative Electrode>
Powder of spinel type lithium titanate ($Li_4Ti_5O_{12}$), which was to operate as negative active material, acetylene black and polyvinylidene fluoride (PVdF) were mixed by 85 mass %, 7 mass % and 8 mass % respectively and added to N-methylpyrrolidone (NMP) to form slurry, which was then applied to the both surfaces of a collector, which was apiece of copper foil of 10 μm, to make it show an electrode density of 27 mg/cm² (not including the collector), dried and pressed to form a negative electrode.
<Preparation of Non-Aqueous Electrolyte>
Lithium hexafluorophosphate ($LiPF_6$) was dissolved into a mixture solvent of a mixture of propylene carbonate and diethyl carbonate of the same volumes to a concentration of 1 mol/litter to prepare a non-aqueous electrolyte.
<Preparation of Battery>
The positive electrode, a porous separator of polyethylene and the negative electrode were wound flat to form an electrode group. The electrode group was contained in an aluminum-made battery jar showing a height of 49.3 mm, a width of 33.7 mm and a thickness of 5.17 mm. The non-aqueous electrolyte was injected into the battery case can by 3.5 g in a vacuum condition and the battery case can was sealed to prepare the battery 1 of Comparative Example. After leaving it at 25° C. overnight, an "initial cycle" process was executed. In the initial cycle process, the battery was electrically charged by way of a constant current/constant voltage charging process, using a current value of 100 mA and a voltage of 2.5 V, at 25° C. for 20 hours, left still for 30 minutes and then electrically discharged by an constant current discharging operation, using a current value of 100 mA, to a final voltage of 1.0 V. At the end of the 2.5 V charging step of the battery, the potential of the positive electrode and that of the negative electrode were about 4.0 V and 1.5 V relative to the potential of lithium respectively. The above charging/discharging cycle was repeated three times (initial cycle) and the discharging capacity (battery capacity) at the third cycle was measured.

COMPARATIVE EXAMPLE BATTERY 2

Comparative Example Battery 2 was prepared in a manner same as Comparative Example Battery 1 except that the coating amount of the negative electrode was changed to 21 mg/cm² (not including the collector). An "initial cycle" process was executed in a manner same as Comparative Example Battery 1 except that the charging voltage was changed to 4.1 V and the discharging capacity (battery capacity) at the third cycle was checked. The potential of the positive electrode and that of the negative electrode of this battery were respectively about 4.3 V and about 0.2 V relative to the potential of lithium of this battery at the end of the 4.1 V charging step.

COMPARATIVE EXAMPLE BATTERY 3

Comparative Example Battery 3 was prepared and an "initial cycle" was executed in a manner same as Comparative Example Battery 2. An additional cycle, or the fourth cycle, was executed in a manner same as the initial cycle except that a charging voltage of 2.5 V was used and the discharging capacity (battery capacity) was checked. The potential of the positive electrode and that of the negative electrode of this battery were respectively about 4.0 V and about 1.5 V relative to the potential of lithium of this battery at the end of the 2.5 V charging step.

COMPARATIVE EXAMPLE BATTERY 4

Comparative Example Battery 4 was prepared in a manner same as Comparative Example Battery 1 except that the powder of spinel type lithium titanate ($Li_4Ti_5O_{12}$), powder of hard carbon, acetylene black and polyvinylidene fluoride (PVdF) were mixed by 70 mass %, 15 mass %, 7 mass % and 8 mass % respectively and applied at an amount of 33 mg/cm² (not including the collector). The hard carbon showed an interplanar spacing ($d_{002}$) of 0.380 nm, an Lc value of 1.1 nm and a BET specific surface area of 6.0 m$^2$/g and operated as auxiliary active material. The potential of the positive electrode and that of the negative electrode of this battery were respectively about 4.0 V and about 1.5 V relative to the potential of lithium of this battery at the end of the 2.5 V charging step. An "initial cycle" process was executed in a manner same as Comparative Example Battery 1 and the discharging capacity (battery capacity) at the third cycle was checked.

EXAMPLE BATTERY 1

Example Battery 1 was prepared in a same manner as Comparative Example Battery 4 except that the coating rate of the negative electrode was changed to 23 mg/cm$^2$ (not including the collector). An "initial cycle" process was executed in a manner same as Comparative Example Battery 4 except that the charging voltage was changed to 4.1 V and the discharging capacity (battery capacity) at the third cycle was checked. The potential of the positive electrode and that of the negative electrode of this battery were respectively about 4.3 V and about 0.2 V relative to the potential of lithium of this battery at the end of the 4.1 V charging step.

EXAMPLE BATTERY 2

Example Battery 2 was prepared and an "initial cycle" process was executed in a manner same as Example Battery 1. An additional cycle, or the fourth cycle, was executed in a manner same as the "initial cycle" except that a charging voltage of 2.5 V was used and the discharging capacity (battery capacity) was observed and checked. The potential of the positive electrode and that of the negative electrode of this battery were respectively about 4.0 V and about 1.5 V relative to the potential of lithium of this battery at the end of the 2.5 V charging step.

EXAMPLE BATTERY 3

Example Battery 3 was prepared in a manner same as Example Battery 2 except that the hard carbon was replaced by soft carbon. The soft carbon showed an interplanar spacing ($d_{002}$) of 0.349 nm, an Lc value of 1.8 nm and a BET specific surface area of 11.5 m$^2$/g and operated as auxiliary active material. The discharging capacity (battery capacity) was checked in a manner as Example Battery 2.

REFERENCE EXAMPLE BATTERY

Reference Example Battery was prepared in a manner as Example Battery 2 except that the hard carbon was replaced by graphite. The graphite showed an interplanar spacing ($d_{002}$) of 0.335 nm, an Lc value of not less than 100 nm and a BET specific surface area of 0.8 m$^2$/g and operated as auxiliary active material. The discharging capacity (battery capacity) was checked in a manner as Example Battery 2.

Table 1 below summarily shows the charging voltage (V) in the charging process executed just before the measurement of the discharging capacity, the potential of the positive electrode and that of the negative electrode (vs. Li/Li$^+$) for the charging voltage as well as the charging voltage (V) in an initial cycle and the potential of the positive electrode and that of the negative electrode (vs. Li/Li$^+$) for the charging voltage for each of Comparative Example Batteries 1 through 3, Example Batteries 1 through 3 and Reference Example Battery.

A large number of finished batteries same as those described above were prepared and the state of charge (SOC) was adjusted to 100% by way of a constant current/constant voltage charging process of 20 hours. A temperature of 25° C., a charging current of 100 mA and the charging voltages used in the charging processes executed just before the measurement of the discharging capacities were used for the constant current/constant voltage charging process. Then, all the batteries were gauged for the thickness at a central part and they were divided, put into thermostat baths at 25, 45 and 60° C. and left there still for 2 weeks. After the still storage, all the batteries were taken out and left at 25° C. for one day before they were gauged for the thickness at a central part. Then, a constant current discharging process was executed on all the batteries also at 25° C. with an electric current of 100 mA and a final voltage of 1.0 V to measure the remaining discharging capacity. Table 2 shows the rating of the change of the thickness at a central part and also the percentage of the remaining discharging capacity after the still storage relative to the discharging capacity before the discharging session of each of the batteries. The increase in the thickness of each of the battery was observed at a central part before and after the initial cycle in the manufacturing process. The obtained results are also shown in Table 2.

TABLE 1

| Battery No. | in operation | | | | in initial cycle | | |
|---|---|---|---|---|---|---|---|
| | charging voltage (V) | positive electrode potential (V) | negative electrode potential (V) | battery capacity (mAh) | charging voltage (V) | positive electrode potential (V) | negative electrode potential (V) |
| Comp. Ex. Battery 1 | 2.5 | 4.0 | 1.5 | 470 | 2.5 | 4.0 | 1.5 |
| Comp. Ex. Battery 2 | 4.1 | 4.3 | 0.2 | 620 | 4.1 | 4.3 | 0.2 |
| Comp. Ex. Battery 3 | 2.5 | 4.0 | 1.5 | 500 | 4.1 | 4.3 | 0.2 |
| Comp. Ex. Battery 4 | 2.5 | 4.0 | 1.5 | 420 | 2.5 | 4.0 | 1.5 |
| Example Battery 1 | 4.1 | 4.3 | 0.2 | 500 | 4.1 | 4.3 | 0.2 |
| Example Battery 2 | 2.5 | 4.0 | 1.5 | 420 | 4.1 | 4.3 | 0.2 |
| Example Battery 3 | 2.5 | 4.0 | 1.5 | 420 | 4.1 | 4.3 | 0.2 |
| Ref. Ex. Battery | 2.5 | 4.0 | 1.5 | 420 | 4.1 | 4.3 | 0.2 |

TABLE 2

| Battery No. | thickness of battery central part after initial 3 cycles | change of thickness of battery central part (after still storage test) | | | remaining discharging capacity (%) | | |
|---|---|---|---|---|---|---|---|
| | | 25° C. | 45° C. | 60° C. | 25° C. | 45° C. | 60° C. |
| Comp. Ex. Battery 1 | x | x | x | x | 97% | 91% | 88% |
| Comp. Ex. Battery 2 | Δ | Δ | x | x | 94% | 84% | 79% |
| Comp. Ex. Battery 3 | Δ | Δ | Δ | x | 96% | 89% | 85% |
| Comp. Ex. Battery 4 | x | x | x | x | 96% | 91% | 87% |
| Example Battery 1 | ○ | ○ | ○ | Δ | 94% | 90% | 85% |
| Example Battery 2 | ○ | ○ | ○ | ○ | 97% | 93% | 91% |
| Example Battery 3 | ○ | ○ | ○ | ○ | 97% | 93% | 90% |
| Ref. Ex. Battery | ○ | ○ | ○ | Δ | 97% | 92% | 88% |

○ not more than +0.05 mm
Δ between +0.05 and +0.2 mm
x not less than +0.2 mm

As clearly seen from Tables 1 and 2, it was found that the change in the battery thickness after the initial cycle was suppressed to a large extent only in the batteries (Example Batteries 1 through 3, Reference Example Battery) whose carbon materials as auxiliary active materials (hard carbon, soft carbon, graphite), had been made to intercalate lithium ions at least once or more than once. Additionally, in the Example Batteries 1 through 3 and Reference Example Battery, all the batteries whose potential at the negative electrode was made equal to 0.2 V in the initial cycle showed a small gas swelling during the still storage. On the other hand, while Comparative Example Batteries 2 and 3 with no carbon materials as auxiliary active materials, whose potential at the negative electrode was made equal to 0.2 V in the initial cycle showed a slight improvement in terms of gas swelling if compared with Comparative Example Battery 1 whose potential at the negative electrode was made equal to 1.5 V, they showed a remarkable gas swelling when stored still at high temperatures. Comparative Example Battery 2 and Example Battery 1 whose battery voltage were high (operated with the potential of the negative electrode left at 0.2 V) differ respectively from Comparative Example Battery 3 and Example Battery 2 showing a low battery voltage in terms of gas swelling after a still storage at high temperatures. Therefore, a battery is preferably operated at a low battery voltage with the potential of the negative electrode thereof held higher than 0.8 V relative to the potential of lithium (about 1.5 V) as in the case of Example Battery 2 in order to prevent gas swelling from taking place due to still storage at high temperatures. Additionally, Reference Example Battery showed a slightly larger gas swelling due to still storage at high temperatures if compared with Example Batteries 2 and 3. The inventor of the present invention presumes that this is attributable to the difference of irreversible capacity among hard carbon, soft carbon and graphite. By comparing the remaining capacities shown in Table 2, it is clear that Example Batteries 1 through 3 and Reference Example Battery whose gas swelling was suppressed showed battery characteristics that are as excellent as Comparative Example Batteries 1, 3 and 4.

Batteries whose potential of the negative electrode was made equal to 1.5 V and those whose potential of the negative electrode was made equal to 0.2 V relative to the potential of lithium at the end of the charging step in the "initial cycle" were observed for the surface of the negative electrode by way of an X-ray photoelectron spectrometer (XPS). While a very thin film coat of partly about 5 nm was observed on the surface of the negative electrode of the batteries whose potential of the negative electrode was made equal to 1.5 V, a film coat of a thickness of 20 nm or more containing at least an ingredient having a carbonate structure was found on all the surface of the negative electrode of the batteries whose potential of the negative electrode was made equal to 0.2 V and no lithium titanate without a surface film coat was detected.

EXAMPLE II

Example Battery 4 and Comparative Example Batteries 5 and 6 as described below were prepared as non-aqueous electrolyte batteries.

EXAMPLE BATTERY 4

Example Battery 4 was prepared in a manner same as Example Battery 1. After executing an "initial cycle", the spin-lattice relaxation time ($T_1$) of the specimen was determined by a solid-state Li—NMR measurement as described below.

<Solid-State Li—NMR Measurement>

The battery was disassembled at the end state of the above-described discharging operation in an argon box and the negative electrode was taken out. The negative electrode composit was sampled from the negative electrode collector and subjected to a solid high resolution 7 Li—NMR observation.

A CMX-300 Infinity (7.05 teslas) (trademark, available from Chemagnetics) and the MAS (magic angle spinning) technique were used for the solid high resolution 7 Li—NMR observation. A 4 mmø sample tube probe was used and the observation was conducted at room temperature (about 25° C.) in a dry nitrogen gas atmosphere with a resonance frequency of 116.1996480 MHz and a sample spinning rate of 13 kHz.

The inversion recovery method was used for gauging the spin-lattice relaxation time ($T_1$). In the measurement, a 180° pulse was irradiated and the Z-component of magnetization was inverted, while an appropriate waiting time was selected, to observe the relaxation where the Z-component of magnetization recovered for equilibrium.

When the waiting time was changed by several steps, a spectrum that corresponds to the waiting time was obtained. FIG. 1 shows the spectrum obtained by changing the waiting time for Example Battery 4. A relaxation curve is obtained by plotting the peak intensities of the observed peak tops relative to the waiting time. The relaxation curve is expressed by the formula shown below when the observed sample is a multi-component system having n phase components that show various spin-lattice relaxation times ($T_1$).

$$\langle X_0 \rangle j = \left\{ \sum_{i=1}^{n} Ai \times \exp(-t/T_1 i) \right\}$$

where
$\langle X_0 \rangle j$: the peak intensity of the spectrum for the j-th data,
n: the number of components,
Ai: the peak intensity of the i-th component,
t: waiting time and
$T_1 i$: the spin-lattice relaxation time of the i-th component.

Figure 3:
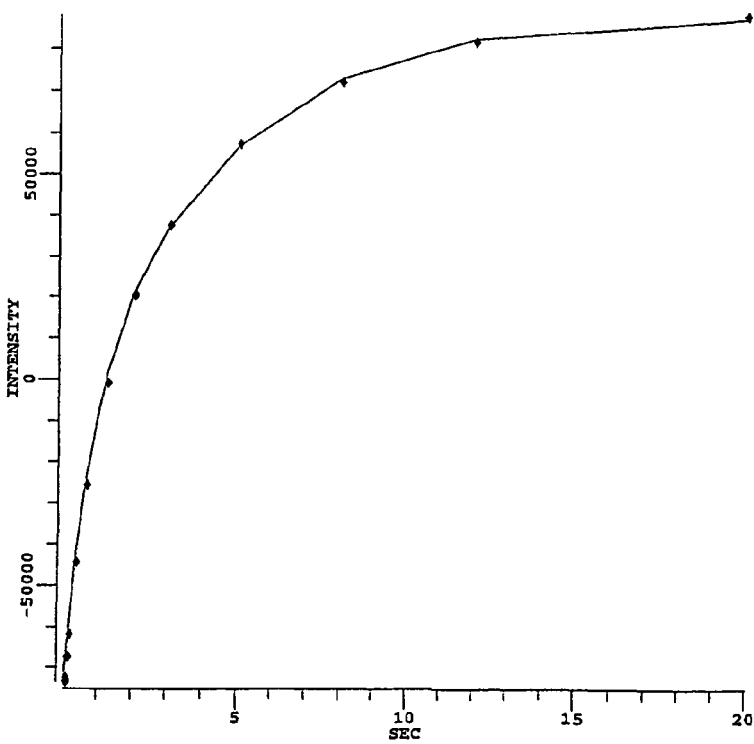
FIG. 3 is a graph illustrating the results of analysis of the spin-lattice relaxation time ($T_1$) of the negative active material used in Example Battery 5 (an instance where Li having two different relaxation times is assumed to exist).

The peak intensities plotted relative to the waiting time was subjected to nonlinear optimization, using a simplex process, in order to determine the values of n, Ai, Ti and i. A technique of assuming several components and using the value of the spin-lattice relaxation time of each of the components and the relative quantity thereof as variables (analysis by histogram) was employed. FIGS. 2 and 3 summarily show the results of analysis obtained for Example Battery 4 when n=1 was assumed and those obtained for Example Battery when n=2 was assumed. The plots and the results agreed with each other well when n=2 was used for analysis. Therefore, n=2 was selected (and hence it was assumed that there existed Li having two different relaxation times).

COMPARATIVE EXAMPLE BATTERY 5

Comparative Example Battery 5 was prepared in a manner same as Comparative Example Battery 1 and an initial cycle was executed. Subsequently, the spin-lattice relaxation time $(T_1)$ of the specimen was determined by a solid-state Li—NMR measurement as in the case of Example Battery 4.

COMPARATIVE EXAMPLE BATTERY 6

Comparative Example Battery 6 was prepared in a manner same as Comparative Example Battery 2 and an initial cycle was executed. Subsequently, the spin-lattice relaxation time $(T_1)$ of the specimen was determined by a solid-state Li—NMR measurement as in the case of Example Battery 4.

COMPARATIVE EXAMPLE BATTERY 7

Comparative Example Battery 7 was prepared in a manner same as Example Battery 1 except that the negative active material was changed to a mixture of 90 mass % of hard carbon powder and 10 mass % of polyvinylidene fluoride and applied to show a negative electrode density of 20 mg/cm² (not including the collector). At the end of the 4.1 V charging process, the positive electrode potential and the negative electrode potential were about 4.3 V and about 0.2 V respectively relative to the potential of lithium. The battery was electrically charged by way of a constant current/constant voltage charging process, using a current value of 100 mA and a voltage of 4.1 V, at 25° C. for 20 hours, left still for 30 minutes and then electrically discharged by an constant current discharging operation, using a current value of 100 mA, to a final voltage of 2.5 V. The above charging/discharging cycle was repeated three times. Subsequently, the spin-lattice relaxation time $(T_1)$ of the specimen was determined by a solid-state Li—NMR measurement as in the case of Example Battery 4.

The spin-lattice relaxation times $(T_1)$ of Example Battery 4 and Comparative Example Batteries 5 through 7 obtained as a result of the measurement are listed in Table 3.

TABLE 3

| Battery | main active material | auxiliary active material | achieve lowest potential of negative electrode (V) | 1-2 ppm relaxation time (sec) | ratio of existence (%) | average relaxation time (sec) |
|---|---|---|---|---|---|---|
| Example Battery 4 | lithium titanate | hard carbon | 0.2 | 4.12 | 66 | 2.94 |
|  |  |  |  | 0.66 | 34 |  |
| Comp. Ex. Battery 5 | lithium titanate | — | 1.5 | 0.46 | 61 | 0.38 |
|  |  |  |  | 0.26 | 39 |  |
| Comp. Ex. Battery 6 | lithium titanate | — | 0.2 | 7.68 | 78 | 6.25 |
|  |  |  |  | 1.08 | 22 |  |
| Comp. Ex. Battery 7 | — | hard carbon | 0.2 | 0.41 | 39 | 0.24 |
|  |  |  |  | 0.13 | 61 |  |

As a result of the solid-state Li—NMR measurement, a peak was observed at or near 0 ppm in each of the specimens to indicate that the chemical shift of the peak of the Li ion component contained in the lithium titanate and the hard carbon was same for all the specimens, although the Li ion component contained in the hard carbon of Comparative Example Battery 7 showed a broad peak profile if compared with the Li ion component contained in the lithium titanate of any of the other batteries.

As for the spin-lattice relaxation time $(T_1)$, the existence of Li showing a large value of spin-lattice relaxation time $(T_1)$ of 4.12 seconds (not less than 1 second) was confirmed for the peak position of 1 to 2 ppm in Example Battery 5, which employed lithium titanate and hard carbon respectively as main active material and auxiliary active material for the negative electrode and whose negative electrode potential was 0.2 V (not higher than 0.8 V) relative to the potential of lithium at the end of the charging process in the initial cycle and the existence of Li showing a large values of spin-lattice relaxation time $(T_1)$ of 7.68 seconds and 1.08 seconds (not less than 1 second) was confirmed in Comparative Example Battery 6, which employed lithium titanate as negative active material and whose negative electrode potential was 0.2 V (not higher than 0.8 V) relative to the potential of lithium at the end of the charging process in the initial cycle, whereas only the existence of Li showing values of spin-lattice relaxation time $(T_1)$ less than 1.00 second, or 0.46 seconds and 0.26 seconds, was confirmed in Comparative Example Battery 5, whose negative electrode potential was 1.5 V relative to the potential of lithium at the end of the charging process in the initial cycle. Furthermore, when only hard carbon was employed for the negative active material, no existence of Li showing large values of spin-lattice relaxation time $(T_1)$ was confirmed in Comparative Example Battery 7 even if the negative electrode potential was 0.2 V relative to the electrode potential of lithium at the end of the charging process in the initial cycle. While the spin-lattice relaxation time $(T_1)$ of Example Battery 5 was shorter than that of Comparative Example Battery 6 that employed only lithium titanate as negative active material probably because hard carbon was admixed to lithium titanate. However, the spin-lattice relaxation time ($T_1$) of not less than 4 seconds of the Example Battery 5 makes it clearly discriminable from Comparative Example Battery 7. From the above, it may be safe to assume that Li showing large values of spin-lattice relaxation time ($T_1$) captures part of the Li existing in the lithium titanate.

Large values of spin-lattice relaxation time ($T_1$) of Li indicate that the Li shows a poor mobility. Therefore, as a result of deep charging of achieving 0.2 V for the negative electrode potential relative to the potential of lithium at the end of the charging process in the initial cycle, presumably some of the Li atoms enter deep into the lithium titanate crystal so that the crystal structure is microcosmically changed around the Li atoms entering deep into the lithium titanate crystal to make the Li atoms hardly movable.

Thus, as a non-aqueous electrolyte battery according to the present invention employs a negative active material that contains both lithium titanate and hard carbon and subjected to a deep charging process as described above, the influence thereof inevitably affects both the lithium titanate and the hard carbon to define the state of the lithium in the lithium titanate and hence the above described characteristics of the negative electrode.

When a carbon material is used as the negative active material of a non-aqueous electrolyte battery, a film coat is formed on the surface of the negative electrode by making the negative electrode potential not higher than 0.8 V relative to the potential of lithium at the end of the charging process in the initial cycle. However, the state of existence of lithium (Li) differs between such a non-aqueous electrolyte battery and a non-aqueous electrolyte battery that employs a negative active material such as lithium titanate that intercalates/deintercalates lithium ions at a potential not lower than 1.2 V and whose negative electrode potential is not higher than 0.8 V relative to the potential of lithium at the end of the charging process in the initial cycle. Therefore, the two batteries can be and should be clearly discriminated.

Additionally, since a carbon material intercalates and deintercalates lithium ions in a potential region lower than the reduction potential of the non-aqueous solvent, a battery employing a carbon material has limits in terms of service life and operation characteristics at high temperature. On the other hand, lithium titanate intercalates and deintercalates lithium ions in a relatively high potential region so that a battery employing lithium titanate is overwhelmingly advantageous in terms of service life and operation characteristics at high temperature.

Therefore, the inventor of the present invention presumes that it is important to make a film coat having a certain thickness and showing lithium ion conductivity exist on the surface of the lithium titanate negative electrode and operating it thereafter in a negative electrode potential range higher than 0.8 V in order to provide a non-aqueous electrolyte battery that can suppress any swelling of the battery due to gas generation. However, gas is generated at the time of forming the film coat and it is impossible to absorb the generated gas. While gas can be discharged by conducting the charging/discharging process in an open condition in a dry atmosphere, such an operation is industrially disadvantageous.

On the other hand, a gas absorbing function becomes expressed after causing the auxiliary active material to intercalate lithium ions at least once and gas swelling was prevented from taking place. Additionally, no remarkable change of the battery thickness is observed when the temperature is raised. The inventor of the present invention presumes that this is because lithium clusters and/or lithium ions are made to exist in the auxiliary active material or on the surface thereof as part of the irreversible capacity and become adsorbed there at about 1.5 V that is the lithium ion intercalation/deintercalation potential of lithium titanate by causing the auxiliary active material to intercalate lithium ions at least once and that such lithium clusters and/or lithium ions provide a gas absorbing function. This technique is industrially highly advantageous.

Industrial Applicability

A non-aqueous electrolyte battery according to the present invention suppresses gas generation and also the increase in the battery thickness. Therefore, it can find applications in flat type batteries and batteries having a sheath of metal resin laminate film.

The invention claimed is:

1. A non-aqueous electrolyte battery, comprising:
a non-aqueous electrolyte containing an electrolyte salt and a non-aqueous solvent, and
a positive electrode and a negative electrode,
wherein a main active material of said negative electrode is an active material that intercalates/deintercalates lithium ions at a potential not lower than 1.2 V relative to a potential of the lithium,
an auxiliary active material of said negative electrode is a low temperature baked carbon material that at least intercalates the lithium ions at a potential lower than 1.2 V relative to the potential of the lithium and shows an interplanar spacing of a (002) plane of not less than 0.34 nm, a crystallite size Lc of not more than 100 nm as observed by wide-angle X-ray diffractometry, and a BET specific surface area of not more than 30 $m^2/g$, and
the lithium shows a spin-lattice relaxation time ($T_1$) of not less than 1 second as determined by a solid-state Li—NMR measurement in the main active material of said negative electrode by lowering the potential of the negative electrode to not higher than 0.3 V relative to the potential of the lithium at least once before operating the non-aqueous electrolyte battery.

2. The battery according to claim 1, wherein a film coat having a carbonate structure exists in the surface of said negative electrode.

3. The battery according to claim 1, wherein the main active material of said negative electrode is spinel-type lithium titanate.

4. The battery according to claim 1, wherein the non-aqueous electrolyte battery is designed such that the potential of the positive electrode becomes not higher than 4.5 V relative to the potential of the lithium when the potential of the negative electrode becomes not higher than 0.8 V relative to the potential of the lithium.

5. The battery according to claim 1, wherein a collector of said negative electrode is copper, nickel or an alloy of them.

6. The battery according to claim 1, wherein the non-aqueous electrolyte battery is operated in a region of the potential of the negative electrode higher than 0.8 V relative to the potential of the lithium.

7. A method of manufacturing a non-aqueous electrolyte battery containing a non-aqueous electrolyte containing an electrolyte salt and a non-aqueous solvent, a positive electrode and a negative electrode comprising forming the battery using, an active material that intercalates/deintercalates lithium ions at a potential not lower than 1.2 V relative to the potential of lithium for the main active material of said negative electrode, and a low-temperature baked carbon material that at least intercalates lithium ions at a potential lower than 1.2 V relative to the potential of lithium and shows an interplanar spacing of the (002) plane of not less than 0.34 nm, a crystallite size Lc of not more than 100 nm as observed by wide-angle X-ray diffractometry, and a BET specific surface area of not more than 30 m²/g for the auxiliary active material of said negative electrode, and lowering the potential of the negative electrode to not higher than 0.3 V relative to the potential of lithium at least once in the initial cycle, thus leading to formation of lithium showing a spin lattice relaxation time (T1) of not less than 1 second as determined by a solid-state Li—NMR measurement in the main active material of said negative electrode.

8. The method according to claim 7, characterized in that a film coat having a carbonate structure is made to exist in the surface of said negative electrode by lowering the potential of the negative electrode to not higher than 0.3 V relative to the potential of lithium at least once in the initial cycle.

9. The method according to claim 7, characterized in that the main active material of said negative electrode is spinel-type lithium titanate.

10. The method according to claims 7, characterized in that the potential of the negative electrode is lowered to not higher than 0.3 V relative to the potential of lithium by raising the charging voltage above the operating voltage in the initial cycle.

11. The method according to claim 10, characterized in that the potential of the positive electrode is made to become not higher than 4.5 V relative to the potential of lithium when the potential of the negative electrode becomes not higher than 0.8 V relative to the potential of lithium.

* * * * *